United States Patent

Cullen

Patent Number: 5,148,613
Date of Patent: Sep. 22, 1992

[54] CLOSET DRIER

[75] Inventor: John S. Cullen, Buffalo, N.Y.

[73] Assignee: Multiform Desiccants, Inc., Buffalo, N.Y.

[21] Appl. No.: 767,485

[22] Filed: Sep. 30, 1991

[51] Int. Cl.[5] ............................. F26B 21/06
[52] U.S. Cl. ............................. 34/81; 34/60; 55/388; 55/281; 55/513; 206/204
[58] Field of Search ............................. 34/80, 81, 60, 9; 55/281, 280, 387, 388, 513, 516; 206/204; 422/218, 261

[56] References Cited

U.S. PATENT DOCUMENTS

| | | | |
|---|---|---|---|
| 1,162,455 | 11/1915 | Collins | 55/517 |
| 2,994,404 | 8/1961 | Schifferly | 55/388 |
| 3,248,862 | 5/1966 | Lovercheck | 55/388 |
| 4,394,144 | 7/1983 | Aoki | 55/281 |
| 4,749,392 | 6/1988 | Aoki et al. | 55/513 |
| 4,927,436 | 5/1990 | Glienke | 55/388 |

FOREIGN PATENT DOCUMENTS 8108514 10/1982 France.

*Primary Examiner*—Henry A. Bennet
*Assistant Examiner*—Denise L. F. Gromada
*Attorney, Agent, or Firm*—Joseph P. Gastel

[57] ABSTRACT

A closet drier including a container having an upper portion and a lower portion divided by a normally stretched elastic diaphragm having perforations therein and retaining deliquescent material in the upper portion of the container, a membrane at the top of the container for permitting only water-vapor, but not liquid water, to pass therethrough into the deliquescent material which forms a solution with the deliquescent material which passes through the perforations into the lower portion of the container, the elastic diaphragm contracting as the deliquescent material is consumed so that the space previously occupied by the deliquescent material can be occupied by the resulting solution, and the perforations in the elastic diaphragm also contracting as the elastic diaphragm contracts to reduce the ability of liquid from underneath the diaphragm in the container from passing therethrough.

16 Claims, 2 Drawing Sheets

CLOSET DRIER

BACKGROUND OF THE INVENTION

The present invention relates to an improved closet drier for absorbing water-vapor from the environment in which it is placed.

By way of background, closet driers are known which utilize a deliquescent material in the upper portion of a container for absorbing water-vapor from the air. In these closet driers, an aqueous solution which is formed by the deliquescent material gravitates to the lower portion of the container. In the past the closet drier was relatively large because the chamber for the deliquescent material was at an elevation above the total of the resulting solution which was formed. Furthermore, prior closet driers could spill the solution in the event they were tipped.

SUMMARY OF THE INVENTION

It is one object of the present invention to provide an improved closet drier wherein the deliquescent material is retained in the upper portion of a container within a chamber which shrinks as the deliquescent material is dissolved by the water-vapor which it absorbs, and thus the resulting container can be relatively small because the resulting solution will fill the space previously occupied by the deliquescent material.

Another object of the present invention is to provide an improved closet drier which is practically spill-proof because it utilizes a stretched elastic diaphragm having perforations therein which permit deliquescent solution to pass therethrough when it is stretched but which reduces the size of the perforations after the deliquescent material is consumed, so that liquid in the container is more restricted from passing through the perforations in the event that the container is tipped.

A further object of the present invention is to provide an improved closet drier which will not be affected by liquid water because it utilizes a membrane which will only pass water-vapor. Other objects and attendant advantages of the present invention will readily be perceived hereafter.

The present invention relates to a closet drier comprising a container having a lower portion and an upper portion, an open top on said container, a first outer edge on said container defining said open top, a normally stretched elastic diaphragm having a second outer edge, means for fastening said second outer edge to said first outer edge, openings in said stretched elastic diaphragm, a vapor-permeable cover, and deliquescent material confined between said normally stretched elastic diaphragm and said vapor-permeable cover in said upper portion of said container for attracting vapor through said vapor-permeable cover while said openings in said stretched elastic diaphragm permit liquid formed by the dissolving of the deliquescent material due to its absorption of said vapor to flow into said lower portion of said container, said normally stretched elastic diaphragm contracting in response to said dissolving of said deliquescent material to thereby cause the volume in said container below said elastic diaphragm to increase. The contraction of the diaphragm also causes the openings therein to contract and thus provide less open spaces through which the liquid can flow from the container in the event it is tipped.

The various aspects of the present invention will be more fully understood when the following portions of the specification are read in conjunction with the accompanying drawings wherein:

DESCRIPTION OF THE PREFERRED EMBODIMENTS

Figure 1:
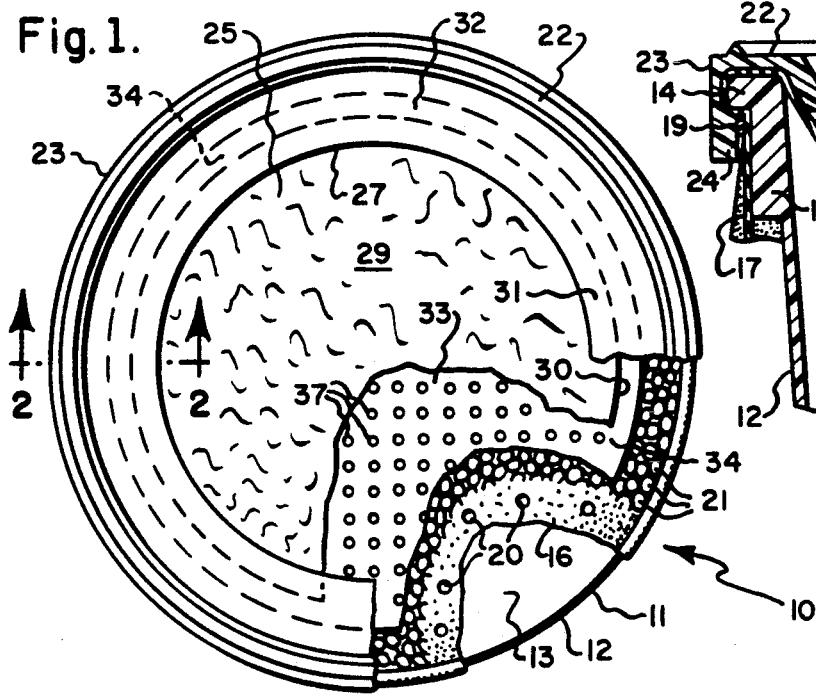
FIG. 1 is a plan view with portions broken away of the closet drier of the present invention.
Figure 2:
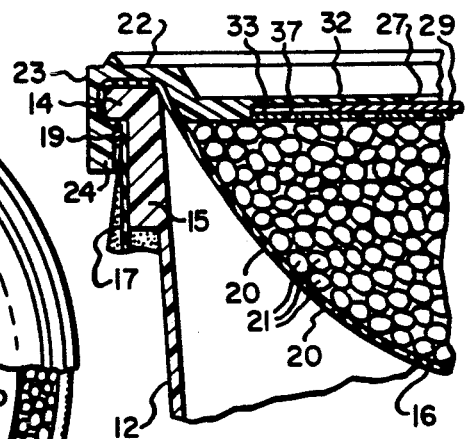
FIG. 2 is an enlarged fragmentary cross sectional view taken substantially along line 2—2 of FIG. 1.

The closet drier 10 includes a container 11 which is preferably made of transparent plastic and in this instance has a frustoconical side wall 12 and a bottom wall 13. The upper edge of side wall 12 terminates at an annular lip 14 which defines the opening of the container. Lip 14 is located at the outer end of thickened portion 15.

A stretched elastic diaphragm 16 has an outer edge 17 which is secured underneath lip 14 by means of an elastic band 19. Diaphragm 16 has a plurality of perforations 20 which are stretched to an opened condition when the diaphragm 16 is in the stretched condition of FIGS. 1-3 and 5. The diaphragm 16 is in the stretched condition of FIGS. 1-3 and 5 when a quantity of deliquescent pellets 21, such as calcium chloride, is packed onto diaphragm 16.

A cover 22 has an annular flange 23 with a protruding lip 24 which fits over and cooperates with annular lip 14 to clamp a portion of the edge 17 of diaphragm 16 therebetween (FIG. 2) to thereby further secure the edge 17 of diaphragm 16 in position, in addition to the securement provided by elastic band 19.

Cover 22 includes a circular opening 25 defined by edge 27. A sheet of web-bonded polyolefin 29, which is known under the trade name TYVEK, has a greater diameter than opening 25 so that the edge 30 of sheet 29 underlies edge 31 of cover portion 32. Sheet 29 will pass water-vapor but will not pass liquid water. To retain sheet 29 in position, a perforated plastic disc 33 underlies permeable sheet 29 and it has an edge portion 34 which is suitably secured by adhesive or the like to the underside 35 of cover 22. Thus, water-vapor can pass through vapor-permeable material 29 and through perforations 37 in disc 33 as it is attracted by the deliquescent material 21. When the closet drier 10 is initially fabricated, an impermeable sheet of material (not shown) is suitably secured across opening 25 of the cover so as not to permit the deliquescent material to be consumed.

Figure 3:
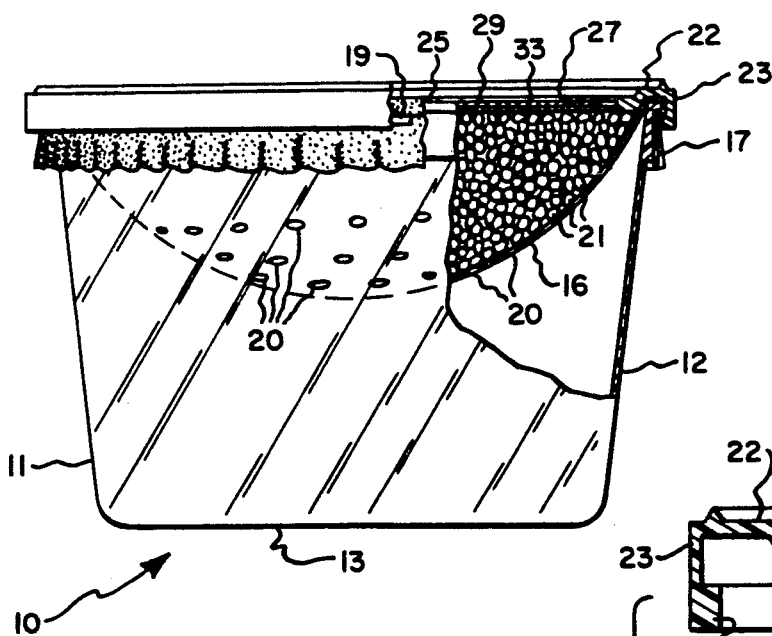
FIG. 3 is a side elevational view of the closet drier with portions broken away.
Figure 4:
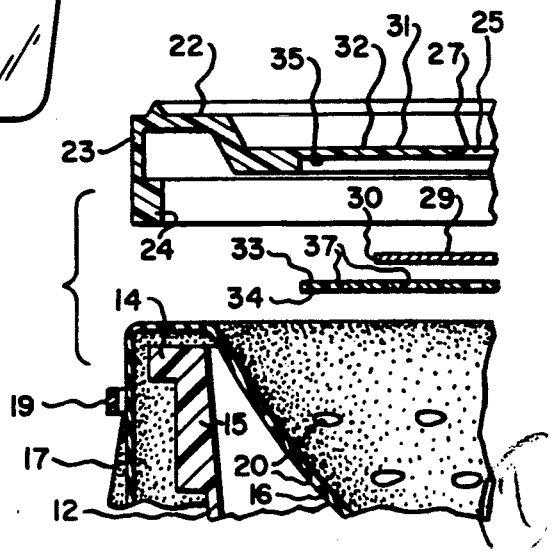
FIG. 4 is an exploded fragmentary cross sectional view of the subject matter of FIG. 2.
Figure 5:
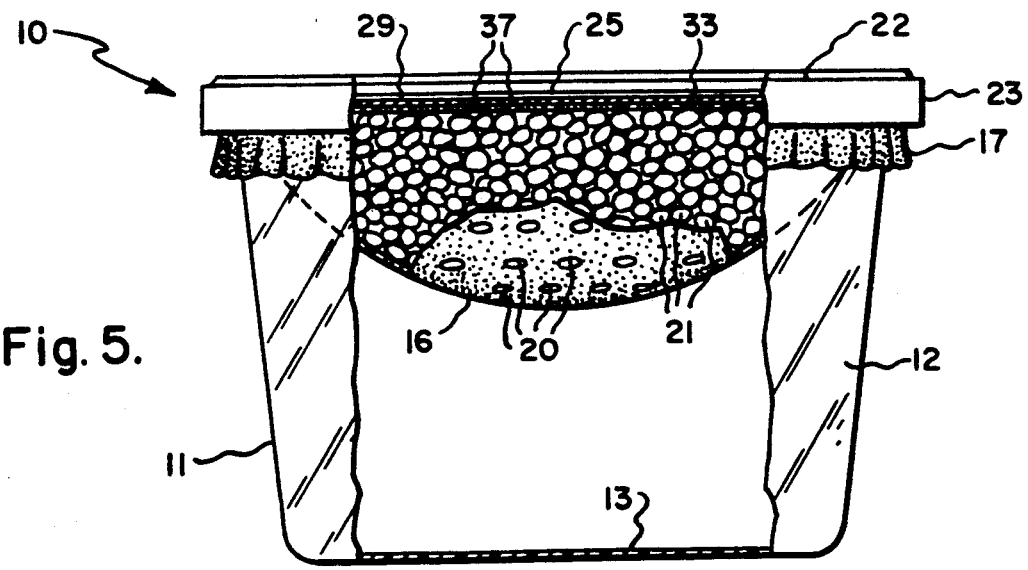
FIG. 5 is a side elevational view with portions broken away showing the closet drier before it has absorbed water-vapor from the environment.
Figure 6:
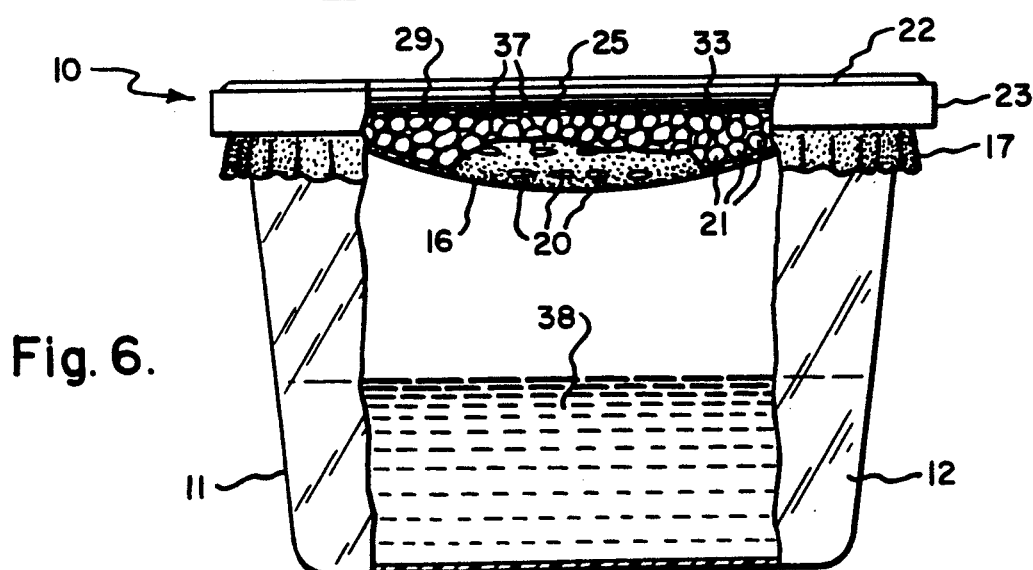
FIG. 6 is a view similar to FIG. 5 but showing the closet drier after a portion of the deliquescent material has been dissolved by water-vapor.

In use, the gas impermeable cover is removed to expose the gas permeable material 29 to the environment in which closet drier 10 is placed. As noted above, the initial condition of closet drier 10 is with the diaphragm 16 stretched, as shown in FIGS. 3 and 5. As water-vapor passes through gas permeable membrane 29, liquid water will be formed by the calcium chloride, and thus a calcium choride solution will drip through perforations 20 into the lower portion of container 11. The diaphragm 16 which was initially stretched will thus contract as the deliquescent material is consumed, and it will assume an intermediate configuration as depicted in FIG. 6. When the deliquescent material is totally consumed, the diaphragm 16 will assume a substantially straightened condition (FIG. 7) and the space previously occupied by the deliquescent material 21 will now be occupied by the liquid 38 which has now substantially filled the container 11. However, if desired, the container need not be of a size where the liquid occupies the space previously occupied by the deliquescent material. As noted above, container 11 is transparent so that the amounts of deliquescent material and solution can be viewed, to determine whether the closet drier is still active.

Figure 7:
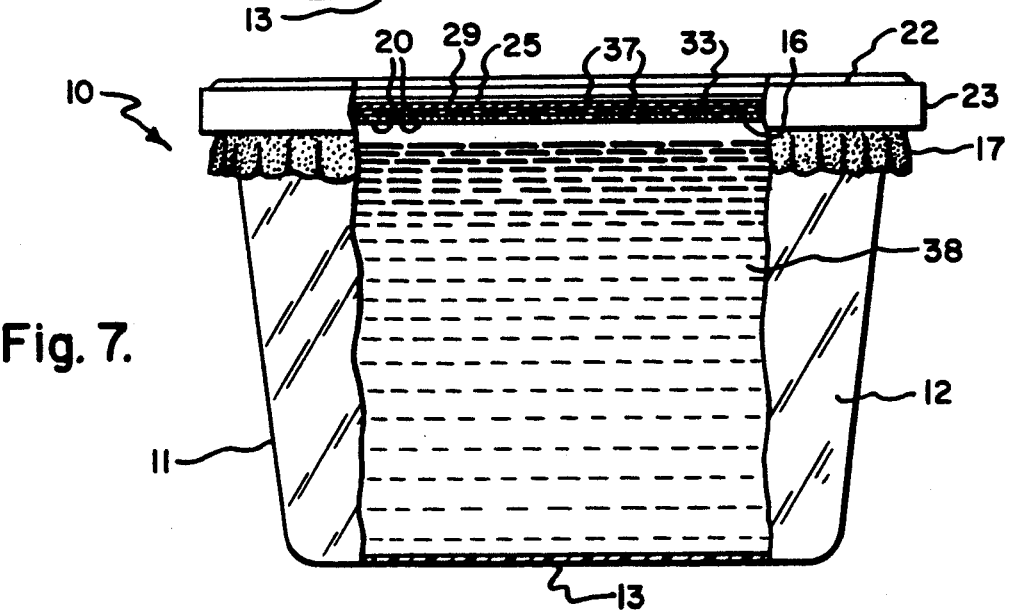
FIG. 7 is a view similar to FIG. 6 but showing the closet drier after the deliquescent material has been completely consumed.

After the diaphragm 16 has contracted to the straightened condition of FIG. 7, the perforations 20 therein, which were initially expanded, will be in a more contracted condition to thus lessen the ability of liquid to flow therethrough. Thus, in the event that the closet drier 10 should be tipped onto its side, it would be more difficult for liquid to spill therefrom because the perforations 20 have been reduced in size. In this respect, in an actual model the perforations 20 were punched to a size of one thirty-second of an inch, and when the diaphragm was stretched, they were stretched to 3 to 4 times this size, and when the diaphragm returned to an unstretched condition, the perforations returned to their one thirty-second of an inch size. Furthermore, the liquid will not spill because the gas permeable membrane 29 will not pass liquid water.

While a preferred embodiment of the present invention has been disclosed, it will be appreciated that it is not limited thereto but may be otherwise embodied within the scope of the following claims.

What is claimed is:

1. A closet drier comprising a container having a lower portion and an upper portion, an open top on said container, a first outer edge on said container defining said open top, a normally stretched elastic diaphragm having a second outer edge, means for fastening said second outer edge to said first outer edge, openings in said stretched elastic diaphragm, a vapor-permeable cover, and deliquescent material confined between said normally stretched elastic diaphragm and said vapor-permeable cover in said upper portion of said container for attracting vapor through said vapor-permeable cover while said openings in said stretched elastic diaphragm permit liquid formed by the dissolving of the deliquescent material due to its absorption of said vapor to flow into said lower portion of said container, said normally stretched elastic diaphragm contracting in response to said dissolving of said deliquescent material to thereby cause said openings therein to contract.

2. A closet drier as set forth in claim 1 wherein said container is of a size so that said liquid which is formed by the dissolving of said deliquescent material occupies the space previously occupied by said deliquescent material.

3. A closet drier as set forth in claim 1 wherein said vapor-permeable cover comprises a material which will pass water-vapor but will not pass liquid water.

4. A closet drier as set forth in claim 3 wherein said container is of a size so that said liquid which is formed by the dissolving of said deliquescent material occupies the space previously occupied by said deliquescent material.

5. A closet drier as set forth in claim 1 wherein said openings in said diaphragm are in a substantially closed condition when said elastic diaphragm is in a fully contracted condition.

6. A closet drier as set forth in claim 5 wherein said vapor-permeable cover comprises a material which will pass water-vapor but will not pass liquid water.

7. A closet drier as set forth in claim 6 wherein said container is of a size so that said liquid which is formed by the dissolving of said deliquescent material occupies the space previously occupied by said deliquescent material.

8. A closet drier as set forth in claim 5 wherein said container is of a size so that said liquid which is formed by the dissolving of said deliquescent material occupies the space previously occupied by said deliquescent material.

9. A closet drier comprising a container having a lower portion and an upper portion, an open top on said container, a first outer edge on said container defining said open top, a normally stretched elastic diaphragm having a second outer edge, means for fastening said second outer edge to said first outer edge, openings in said stretched elastic diaphragm, a vapor-permeable cover, and deliquescent material confined between said normally stretched elastic diaphragm and said cover in said upper portion of said container for attracting vapor through said vapor-permeable cover while said openings in said stretched elastic diaphragm permit liquid formed by the dissolving of the deliquescent material due to its absorption of said vapor to flow into said lower portion of said container, said normally stretched elastic diaphragm contracting in response to said dissolving of said deliquescent material to permit the volume in said container below said elastic diaphragm to increase.

10. A closet drier as set forth in claim 9 wherein said container is of a size so that said liquid which is formed by the dissolving of said deliquescent material occupies the space previously occupied by said deliquescent material.

11. A closet drier as set forth in claim 9 wherein said vapor-permeable cover comprises a material which will pass water-vapor but will not pass liquid water.

12. A closet drier as set forth in claim 11 wherein said container is of a size so that said liquid which is formed by the dissolving of said deliquescent material occupies the space previously occupied by said deliquescent material.

13. A closet drier as set forth in claim 9 wherein said openings in said diaphragm are in a more closed condition when said elastic diaphragm is in a fully contracted condition than when it was stretched.

14. A closet drier as set forth in claim 13 wherein said vapor-permeable cover comprises a material which will pass water-vapor but will not pass liquid water.

15. A closet drier as set forth in claim 14 wherein said container is of a size so that said liquid which is formed by the dissolving of said deliquescent material occupies the space previously occupied by said deliquescent material.

16. A closet drier as set forth in claim 13 wherein said container is of a size so that said liquid which is formed by the dissolving of said deliquescent material occupies the space previously occupied by said deliquescent material.

* * * * *